(12) United States Patent
Doh

(10) Patent No.: US 7,562,467 B2
(45) Date of Patent: Jul. 21, 2009

(54) DRYER, AND MOTOR MOUNTING STRUCTURE OF THE SAME

(75) Inventor: Young Jin Doh, Busan-si (KR)

(73) Assignee: LG Electronics Inc., Seoul (KR)

( * ) Notice: Subject to any disclaimer, the term of this patent is extended or adjusted under 35 U.S.C. 154(b) by 446 days.

(21) Appl. No.: 11/016,816

(22) Filed: Dec. 21, 2004

(65) Prior Publication Data

US 2005/0132601 A1   Jun. 23, 2005

(30) Foreign Application Priority Data

Dec. 22, 2003   (KR)   ........................ 10-2003-0094463
Dec. 22, 2003   (KR)   ........................ 10-2003-0094470

(51) Int. Cl.
*F26B 19/00*   (2006.01)
*F26B 11/02*   (2006.01)

(52) U.S. Cl. ...................................................... 34/601

(58) Field of Classification Search ................... 34/601, 34/603, 139, 595, 239; 248/642, 657
See application file for complete search history.

(56) References Cited

U.S. PATENT DOCUMENTS

| | | | |
|---|---|---|---|
| 1,958,119 A * | 5/1934 | Tarr | ........................... 248/596 |
| 2,276,814 A | 3/1942 | Zwickl | |
| 3,110,164 A | 11/1963 | Smith | |
| 3,421,724 A * | 1/1969 | Cornell | ........................ 248/657 |
| 4,649,654 A * | 3/1987 | Hikino et al. | .................. 34/493 |
| 5,025,634 A | 6/1991 | Dressler | |
| 6,276,148 B1 | 8/2001 | Shaw | |

FOREIGN PATENT DOCUMENTS

EP   0240441   10/1987
EP   0 327 087 A1   8/1989

* cited by examiner

*Primary Examiner*—Jiping Lu
(74) *Attorney, Agent, or Firm*—Birch, Stewart, Kolasch & Birch, LLP

(57) ABSTRACT

A dryer and a motor mounting structure of the same are provided. The dryer includes: a cabinet; a drum housed inside of the cabinet; a motor for providing a driving force to the drum; a belt for connecting a driving shaft of the motor with the drum; a base disposed at a lower side of the drum; a motor supporter having a pass-through part, which is disposed at its one side and supports the driving shaft; a cushion provided between the driving shaft and the motor supporter; a guide rib provided at the base; and a guide rib inserting part provided at the motor supporter to have a corresponding shape of the guide rib, such that the motor supporter is slid and mounted on the base.

12 Claims, 9 Drawing Sheets

DRYER, AND MOTOR MOUNTING STRUCTURE OF THE SAME

BACKGROUND OF THE INVENTION

1. Field of the Invention

The present invention relates to a dryer, and more particularly, to a motor mounting structure for firmly supporting a motor when a dryer is operated. Much more particularly, the present invention relates to a dryer and a motor mounting structure of the same in which a motor can be conveniently mounted and dismounted, and parts are not destroyed when the motor is operated.

2. Description of the Related Art

Dryer sends hot air, which is generated by an electric heater, a gas combustion device or the like, inside of a drum to eliminate remnant moisture from a target object such as clothing, thereby drying the target clothing.

The dryer includes a drum rotating with the clothing housed therein; a motor for rotating the drum; a heater for heating the air; a circulation fan for circulating the air; and a passage structure for flowing the air.

Further, the dryer is operated in such a manner that a belt is wound around the drum and the belt is connected with the driving shaft of the motor to rotate the drum by the rotation of the belt. In addition, the dryer connects the driving shaft of the motor with the circulation fan to operate the circulation fan. As a result, the motor rotates the drum in association with the belt, and is connected with the circulation fan to forcibly flow the air. As such, since a single motor is used to perform a plurality of functions, the motor is mounted as a comparative large-sized module inside of the dryer.

Alternatively, a conventional motor mounting structure has a drawback in that since the motor is disposed in a larger space, it is difficult to mount and dismount the motor. Further, the conventional motor mounting structure has a drawback in that it is difficult to repair the motor.

Further, a predetermined cushion is disposed at a periphery of a driving shaft to stop the vibration of the motor from being propagated to the external. Accordingly, the conventional motor mounting structure has a drawback in that in case where the vibration is continuously applied to the cushion, the cushion is separated from the driving shaft.

SUMMARY OF THE INVENTION

Accordingly, the present invention is directed to a dryer and a motor mounting structure of the same that substantially obviate one or more problems due to limitations and disadvantages of the related art.

An object of the present invention is to provide a dryer and a motor mounting structure of the same in which a motor can be easily mounted and dismounted.

Another object of the present invention is to provide a dryer and a motor mounting structure of the same in which a periphery of a motor can be conveniently repaired even though the motor mounting structure is wholly disassembled.

A still another object of the present invention is to provide a dryer and a motor mounting structure of the same in which a cushion disposed at a periphery of a motor is firmly located and supported to improve the motor in operational reliability.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a dryer including: a cabinet; a drum housed inside of the cabinet; a motor for providing a driving force to the drum; a belt for connecting a driving shaft of the motor with the drum; a base disposed at a lower side of the drum; a motor supporter having a pass-through part, which is disposed at its one side and supports the driving shaft; a cushion provided between the driving shaft and the motor supporter; a guide rib provided at the base; and a guide rib inserting part provided at the motor supporter to have a corresponding shape of the guide rib, such that the motor supporter is slid and mounted on the base.

In another aspect of the present invention, there is provided a motor mounting structure of a dryer, the structure including: a base provided at a lower side of the dryer; a motor disposed on the base and having a motor shaft extended; a motor supporter for supporting the motor shaft; a motor supporter housing part concaved at the base; a first guide part provided at the motor supporter housing part to have a circular arc shape; and a second guide part provided at the motor supporter to have a corresponding shape of the first guide part.

In a further aspect of the present invention, there is provided a motor mounting structure of a dryer, the structure including: a base provided at a lower side of the dryer; a motor disposed on the base and having a motor shaft extended at both sides; a motor supporter for supporting the motor shaft; a circular shaped cushion interposed between the motor shaft and the motor supporter and having at least one portion with a different curvature; a first guide part provided at the base to have a circular arc shape; and a second guide part provided at the motor supporter to have a corresponding shape of the first guide part.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
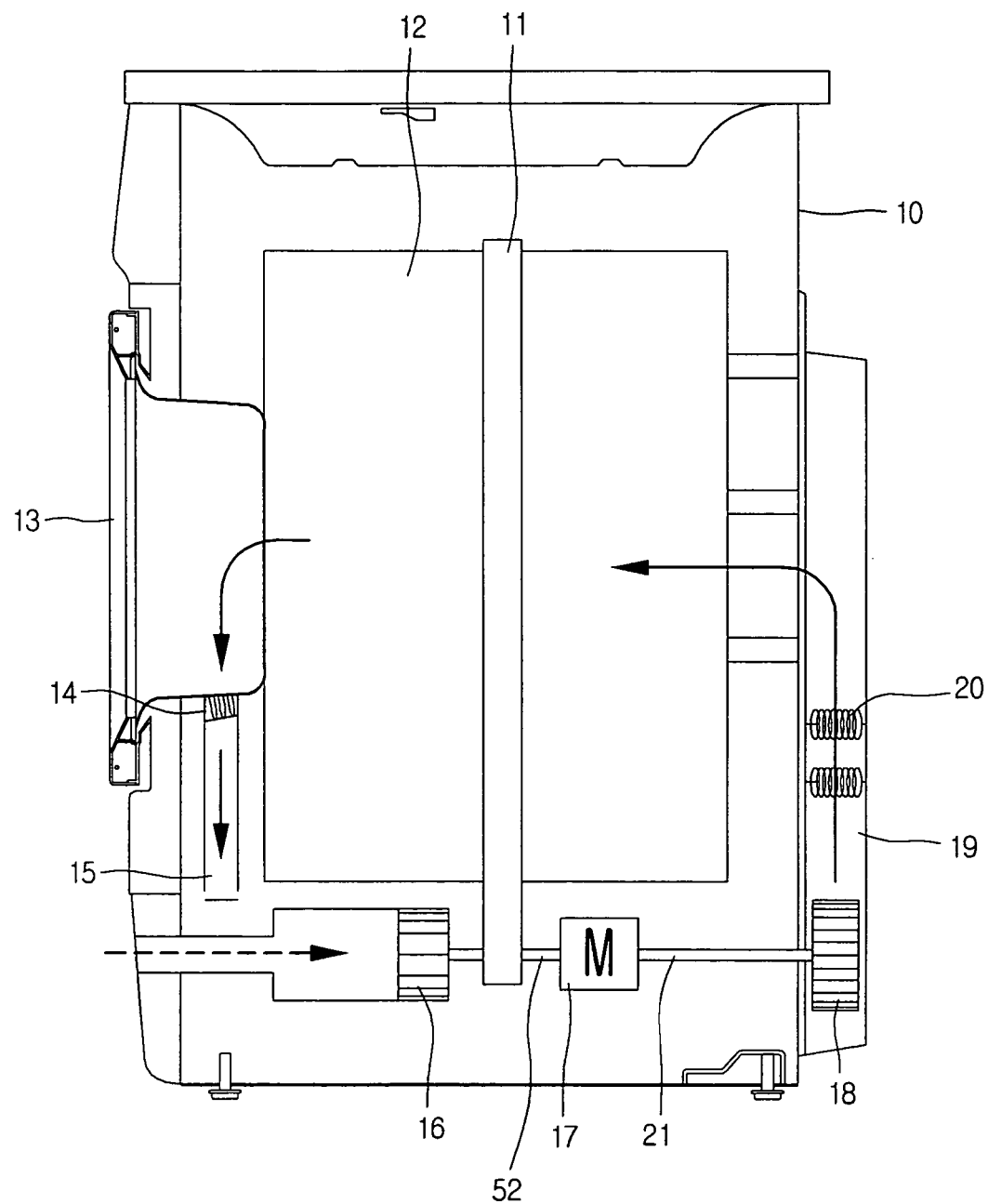
FIG. 1 is a schematic sectional view illustrating a drum dryer according to the present invention.
Figure 2:
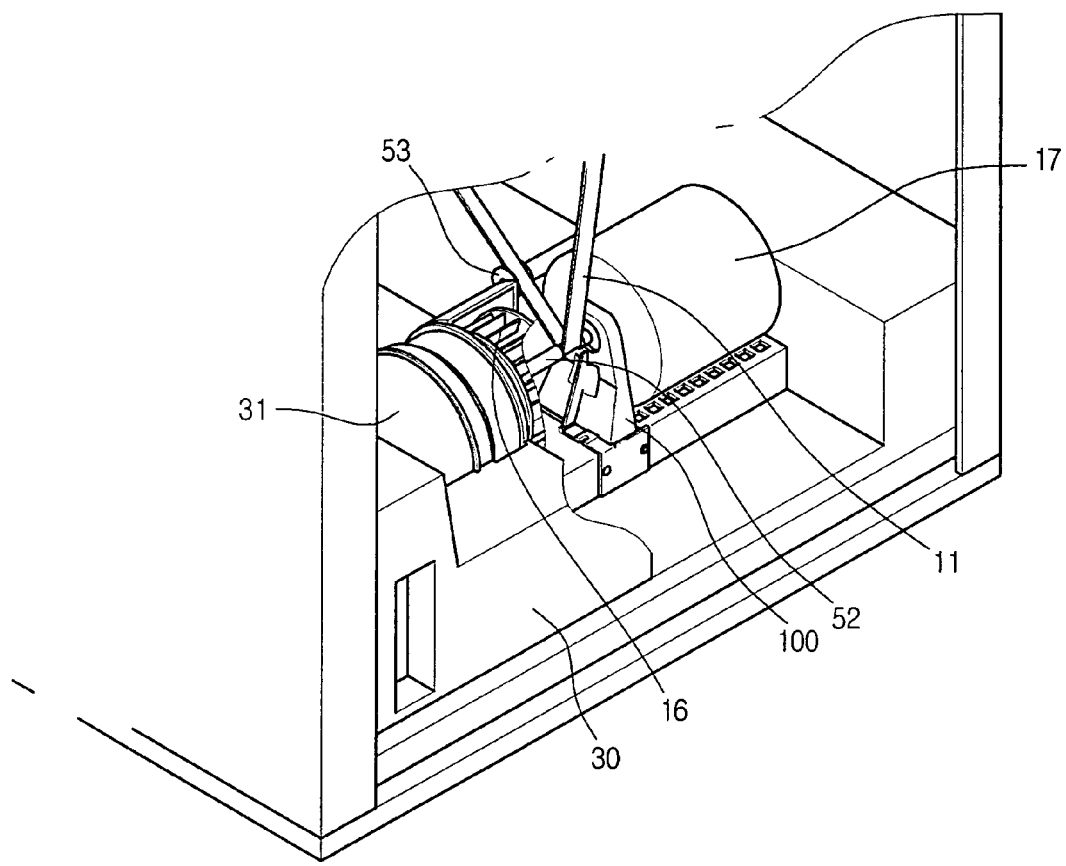
FIG. 2 is an enlarged perspective view illustrating a periphery of a motor according to the present invention.

FIG. 1 is a schematic sectional view illustrating a drum dryer according to the present invention, and FIG. 2 is an enlarged perspective view illustrating a periphery of a motor according to the present invention.

Referring to FIGS. 1 and 2, the condenser-type drum dryer includes a cabinet 10 providing an exterior appearance; a cylindrical drum 12 disposed inside of the cabinet 10; a door for opening and closing the drum 12; and a belt 11 wound around the drum 12.

Further, the dryer includes a cooling fan side motor shaft 52 connected with the belt 11; a drying fan side motor shaft 21 connected with a motor 17 at an opposite of the cooling fan side motor shaft 52; the motor 17 connected with the motor shafts 21 and 52 to provide a rotary force; a cooling fan 16 connected to the cooling fan side motor shaft 52 to rotate by the motor 17 while introducing an indoor air through a blower 31.

In detail, the belt 11 is wound around a pulley 53 connected with a shaft extended at a rear side of the motor, such that the belt 11 is strongly attached to an outer surface of the drum 12.

Further, the dryer includes a drying fan 18 connected with the drying fan side motor shaft 21 to face with the cooling fan 16, thereby circulating the air in the drum; and a drying duct 19 having a heater 20 disposed therein and functioning as a passage for moving the intake air to the drum 12.

Furthermore, the dryer includes a lint filter 14 disposed at a lower side of an opening part into which the door 13 is inserted, to filter a foreign substance such as nap from a humid air exhausted from the drum; and a circulation duct 15 functioning as a passage for moving the air introduced into the lint filter 14, to the condenser (not shown).

Hereinafter, an operation of the dryer according to the present invention will be described.

First, if a power is applied to the dryer, the motor 17 is rotated, and a heater 20 dissipates a heat in the drying duct 19. Additionally, the belt 11 connected to the cooling fan side motor shaft 52 is rotated to rotate the drum 12. Additionally, as the drum 12 rotates, the laundry disposed inside the drum is rotated together with and along an inner wall of the drum, and the laundry drops by self-weight at a top of the drum. Here, the laundry is raised using a lifter (not shown) disposed at the inner wall of the drum.

Meanwhile, the drying fan 18 connected to the drying fan side motor shaft 21 is operated at the same time of the rotation of the motor 17, to introduce the circulated air passing through the lint filter 14. As the intake air rises along the drying duct 19, the intake air becomes a high-temperature and dry air via the heater 20. Additionally, the high-temperature and dry air passes through the drum while absorbing the moisture from the laundry to become a high-temperature and humid air.

Further, the high-temperature and humid air is again filtered by the lint filter 14, and then directed to the condenser (not shown) depending on the circulation duct 15.

Furthermore, when the cooling fan 16 connected to the motor shaft 21 is rotated, the cooling fan 16 introduces the indoor air from the exterior. Additionally, the intake indoor air is introduced into the condenser via the cooling fan 16.

Here, the high-temperature and humid air directing to the condenser along the circulation duct 15, and the indoor air introduced by the cooling fan 16 and directing to the condenser are intersected with each other when they pass through the condenser. Additionally, the high-temperature and humid air and the indoor air are not mixed with each other but heat-exchanged due to a configuration of the condenser.

Accordingly, while the high-temperature and humid air passes through the condenser, it gives a heat to the indoor air, thereby becoming a low-temperature and humid air. Additionally, when the high-temperature and humid air is decreased in temperature, the high-temperature and humid air is condensed and condensate water is dropped to a floor of the condenser, thereby being directed to a sump (not shown) for collecting the condensate water.

Meanwhile, the indoor air passing through the condenser obtains the heat from the high-temperature and humid air to convert the high-temperature and humid air into the low-temperature and humid air, and to increase in temperature.

Here, the motor 17 is mounted on the base, and is supported by the motor supporter 100 connected to the motor shaft.

Alternatively, the present invention is characterized in that the motor 17 is conveniently mounted and dismounted, and the motor is improved in operational reliability.

Hereinafter, the motor mounting structure is in detail described.

Figure 3:
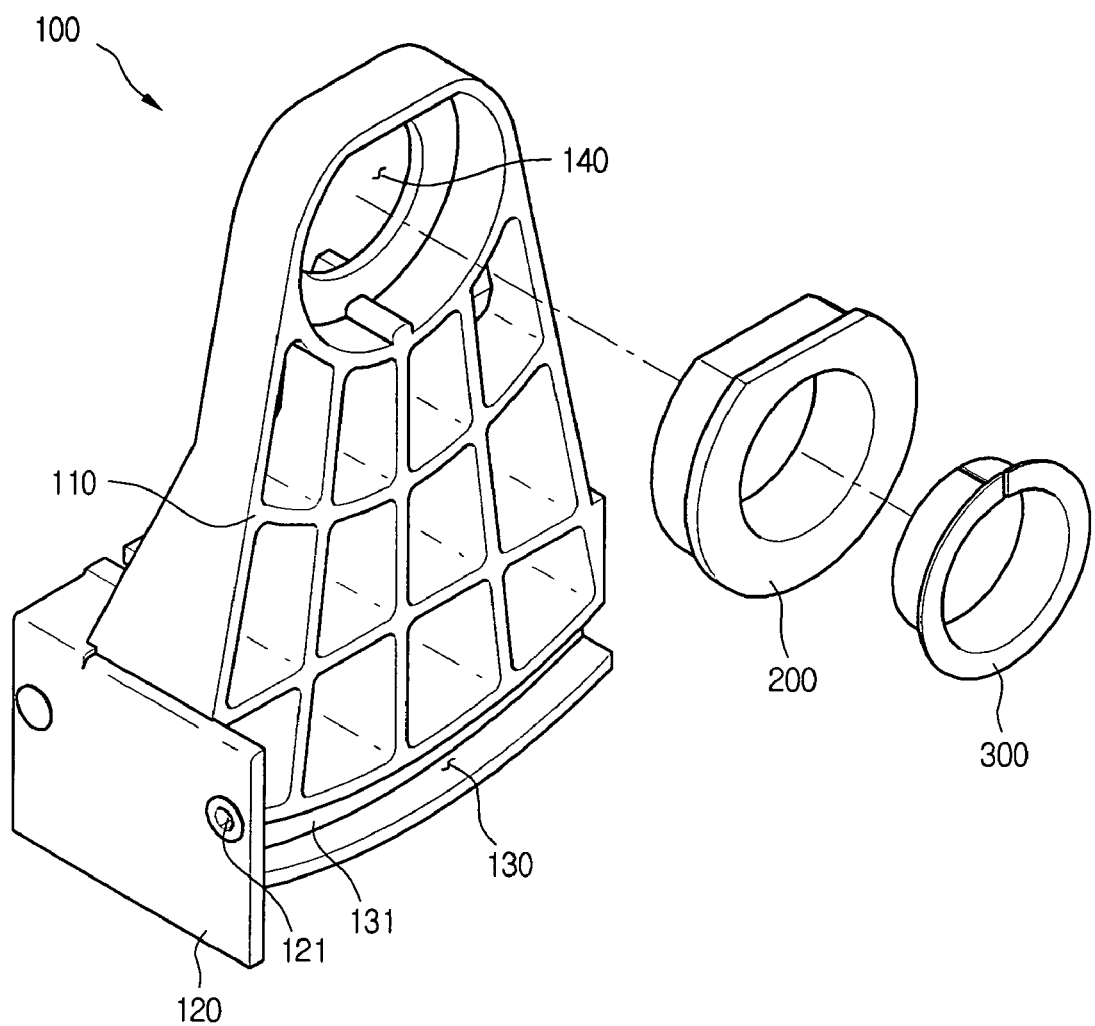
FIGS. 3 and 4 are front and rear perspective views illustrating a motor supporter according to the present invention.
Figure 4:
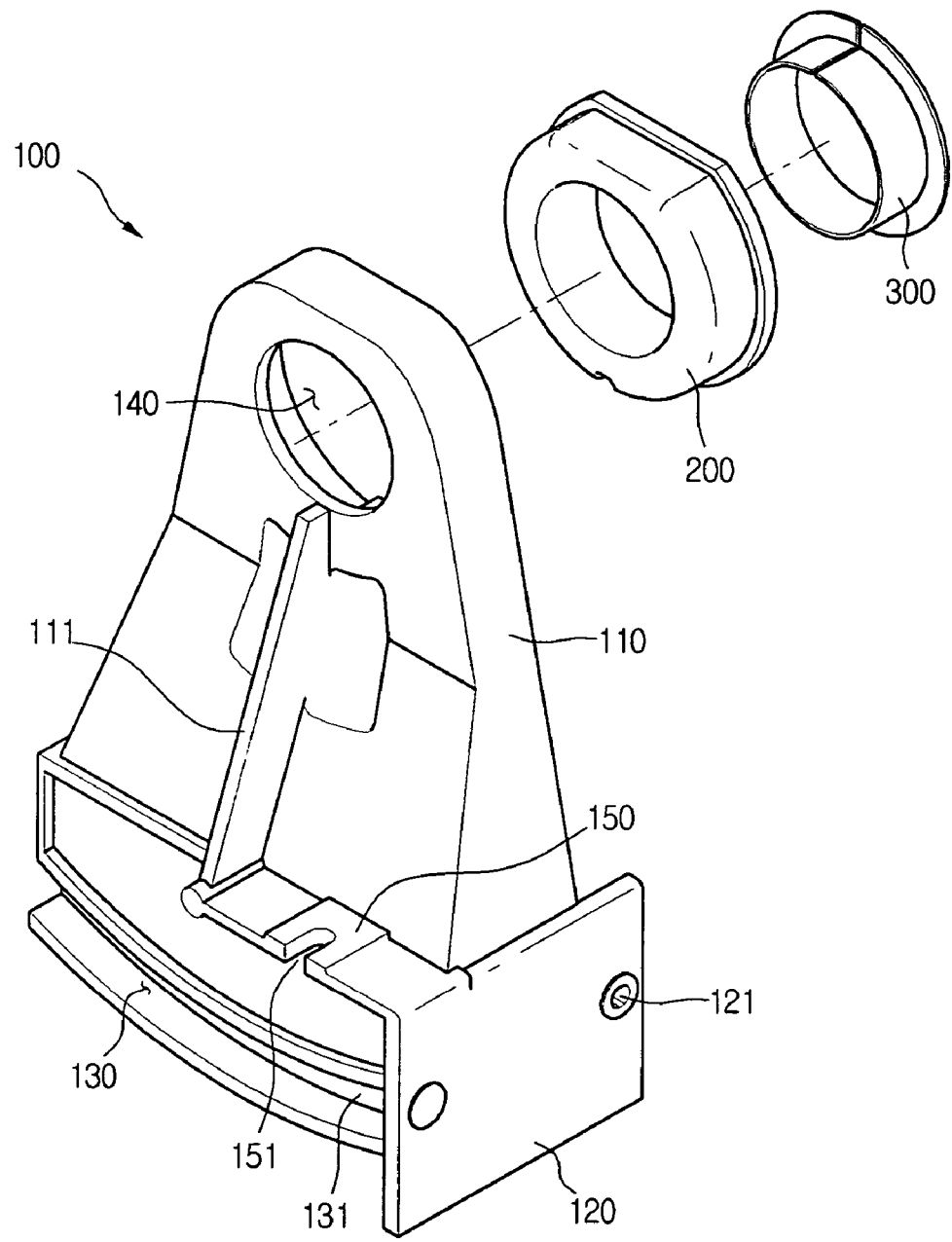
Figure 5:
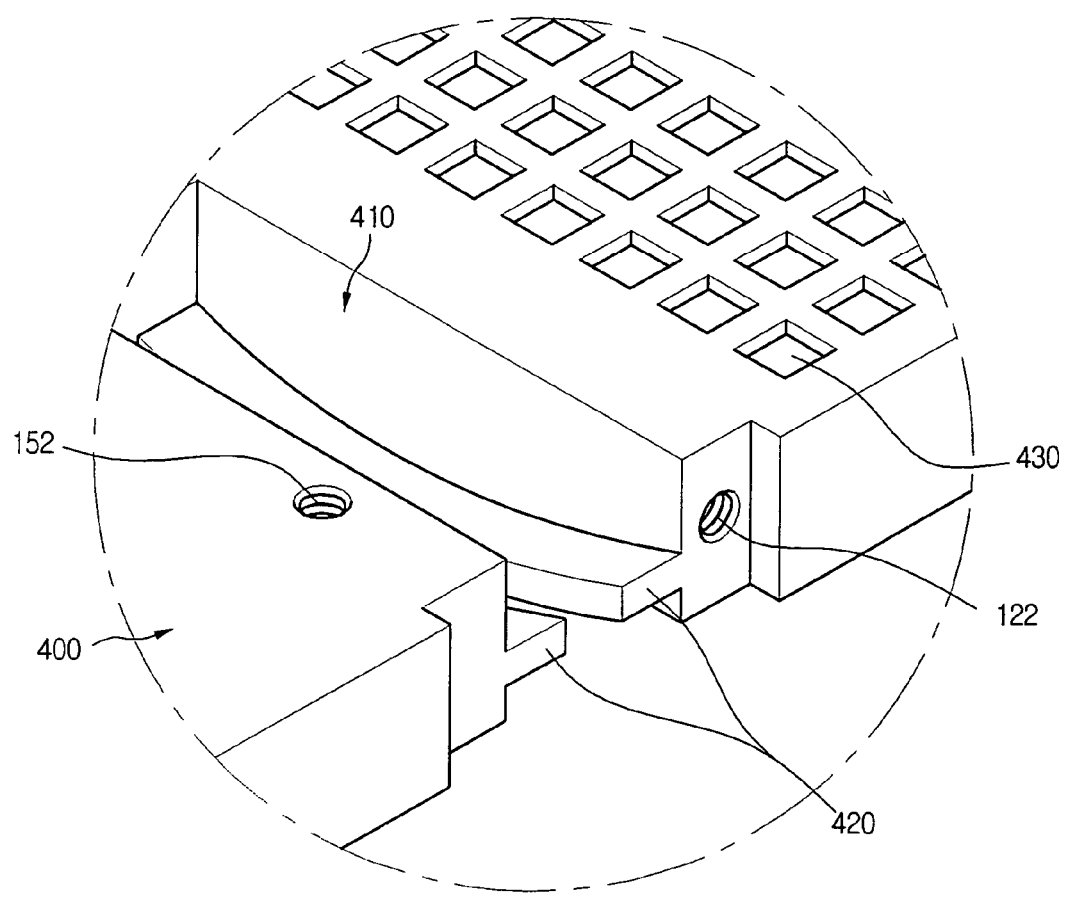
FIG. 5 is a perspective view illustrating a motor supporter mounting part.
Figure 6:
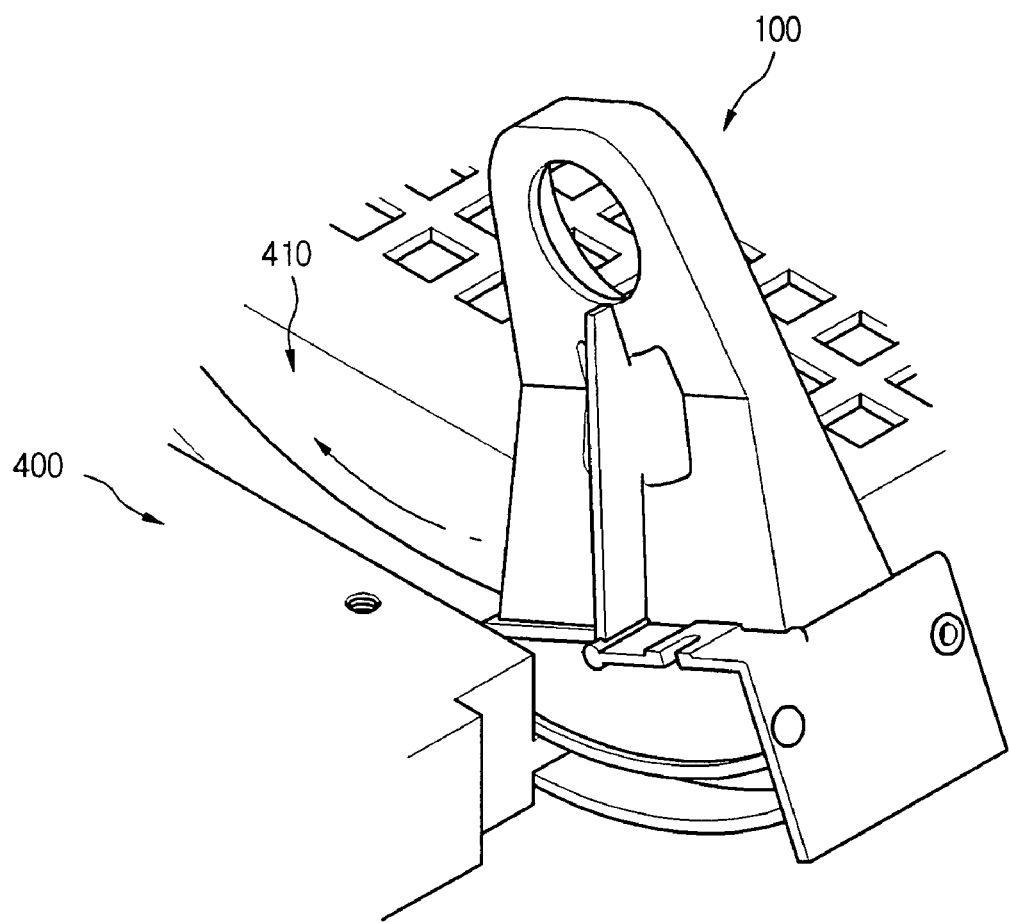
FIG. 6 is a view illustrating an interaction between a motor supporter and a motor supporter mounting part.

FIGS. 3 and 4 are front and rear perspective views illustrating the motor supporter according to the present invention, FIG. 5 is a perspective view illustrating the motor supporter mounting part, and FIG. 6 is a view illustrating an interaction between the motor supporter and the motor supporter mounting part.

Referring to FIGS. 3 to 6, the inventive motor supporter 100 includes a supporter body 110; a motor shaft through-hole 140 disposed at an upper side of the supporter body 110 to allow the passing of the motor shaft; and a guide rib inserting part 130 disposed at lower and both sides of the supporter body 110 and having a groove with a predetermined depth and a predetermined curvature radius. The guide rib inserting part 130 is disposed at each of both front and rear sides of the supporter body 110.

Further, the motor supporter 100 includes a center dividing shaft 131 provided at a center of the guide rib inserting part 130; and a front reinforcing rib 120 and an upper reinforcing rib 150 for entirely adhering and inserting the motor supporter 100 to the base 400 to prevent the vibration of the motor supporter 100. Additionally, the motor supporter 100 includes a front engaging part 121 and an upper engaging part 151 provided on the front reinforcing rib 120 and the upper reinforcing rib 150 to insert a predetermined engaging member for engaging the motor supporter 100 with the base 400.

Further, a vertical reinforcing rib 111 is vertically disposed at a lower side of the supporter body 110 and at a center of the supporter body 110.

Furthermore, the motor supporter 100 includes the cushion 200 disposed in the motor shaft through-hole 140 to absorb a vibration from the motor shaft; and an anti-friction bushing 300 inserted to an inner circumference surface of the cushion 200 to be in direct contact with the motor shaft, thereby reducing a friction force against the motor shaft.

Additionally, the base 400 includes a motor supporter mounting part 410 downwardly concaved at the base 400 to allow the motor supporter 100 to be mounted; and a heat sink part 430 disposed at a right side of the motor supporter mounting part 410. The heat sink part 430 rapidly dissipates the heat from the motor to the external, and has a plurality of openings provided at the base 400.

In detail, a guide rib 420 having a corresponding shape of the guide rib inserting part 130 is provided at the motor supporter mounting part 410. As shown, the guide rib 420 is symmetrically disposed at both sides to have the same curvature radius as the guide rib inserting part 130.

Additionally, the guide rib 420 is disposed to have a depth corresponding to a distance from the upper reinforcing rib 150 to the guide rib inserting part 130.

Further, the motor supporter mounting part 410 is concaved at its front portion to have the same shape and depth as the front reinforcing rib 120, thereby allowing the front reinforcing rib 120 to be mounted. Additionally, when the motor supporter 100 is entirely inserted and mounted on the motor supporter mounting part 410, a front engaging groove 122 and an upper engaging groove 152 are respectively provided on the base 400 to be aligned with the front engaging part 121 and the upper engaging part 151. Of course, a predetermined engaging member can be inserted into an engaging groove and an engaging part aligned with each other, to firmly support the motor supporter 410.

FIG. 6 illustrates a procedure of mounting the motor supporter 100 on the base 400. In FIG. 6, the mounting procedure of the motor supporter 100 can be apparently understood.

First, after the motor shaft 52 is inserted into the motor shaft through-hole 140, the motor supporter 100 is pushed toward the motor 17. At this time, the motor 17 is in its regular position on the base 400.

Additionally, if the center dividing shaft 131 is adapted to and fitted into a gap provided between the guide ribs 420 of the base 400 and then, the motor supporter 100 is rotated, the guide rib 420 is inserted along the guide rib inserting part 130. Additionally, if the motor supporter 100 is fully inserted, the engaging member is inserted into the front engaging part 121 and the upper engaging part 151 to engage the motor supporter 100 with the base 400.

In detail, the guide rib 420 and the guide rib inserting part 130 have a predetermined curvature. The curvature is provided in a circular arc shape centering on the motor shaft through-hole 140. Therefore, when the motor supporter 100 is inserted into or is released from the base 400, the motor supporter 100 performs only a rotational motion with respect to the motor shaft through-hole 140 and does not perform a translation motion in any direction. Therefore, a worker can more conveniently mount the motor supporter 100.

In the same way, the motor supporter 100 is released from the base 400, by rotating only the motor supporter 100 in a state where the motor 17 is fixed in position.

Further, since the motor supporter 100 is slid and inserted with respect to the base 400, a worker's convenience is more increased.

Figure 7:
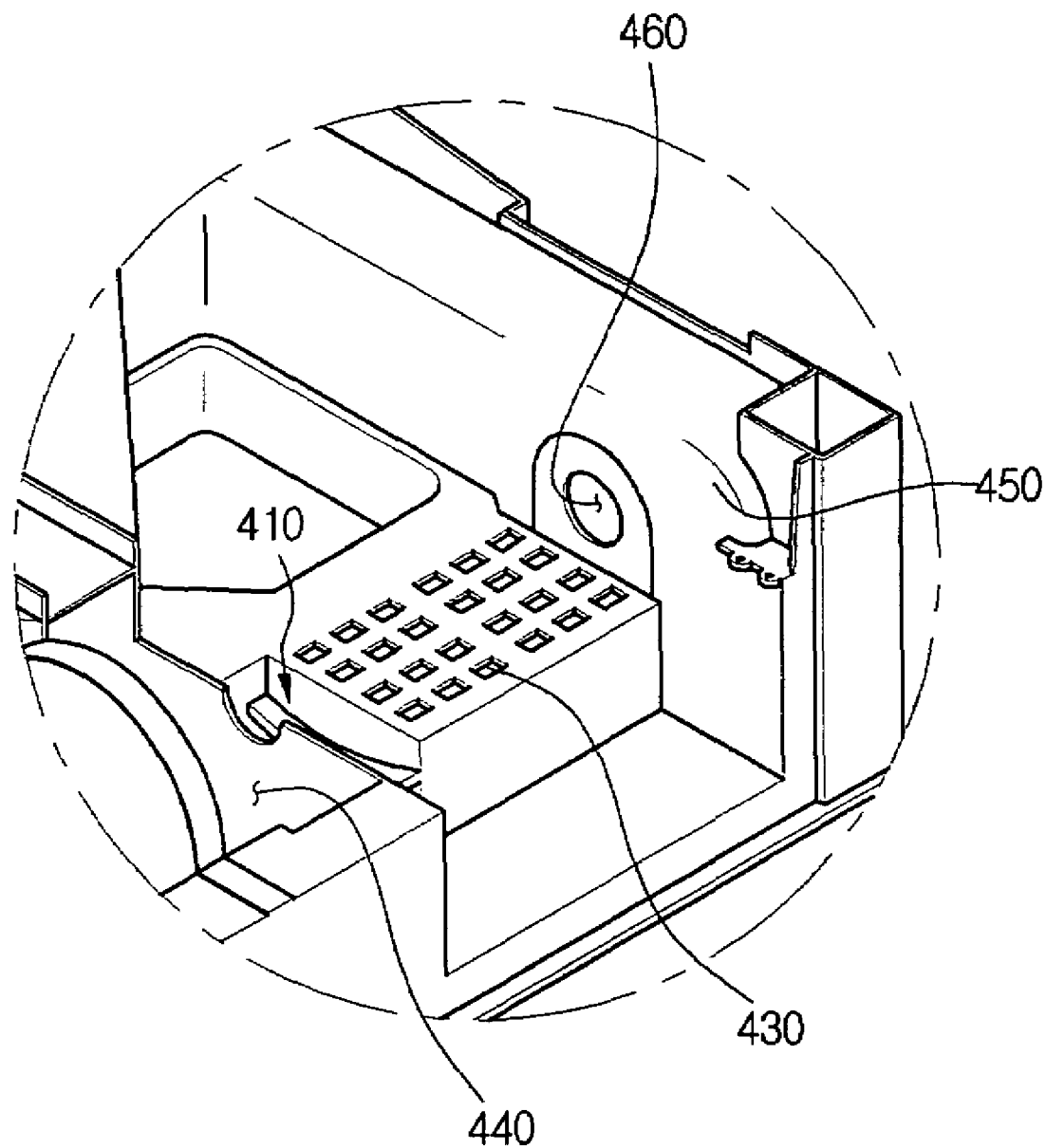
FIG. 7 is a perspective view illustrating a base having a cushion inserting part for inserting a cushion.
Figure 8:
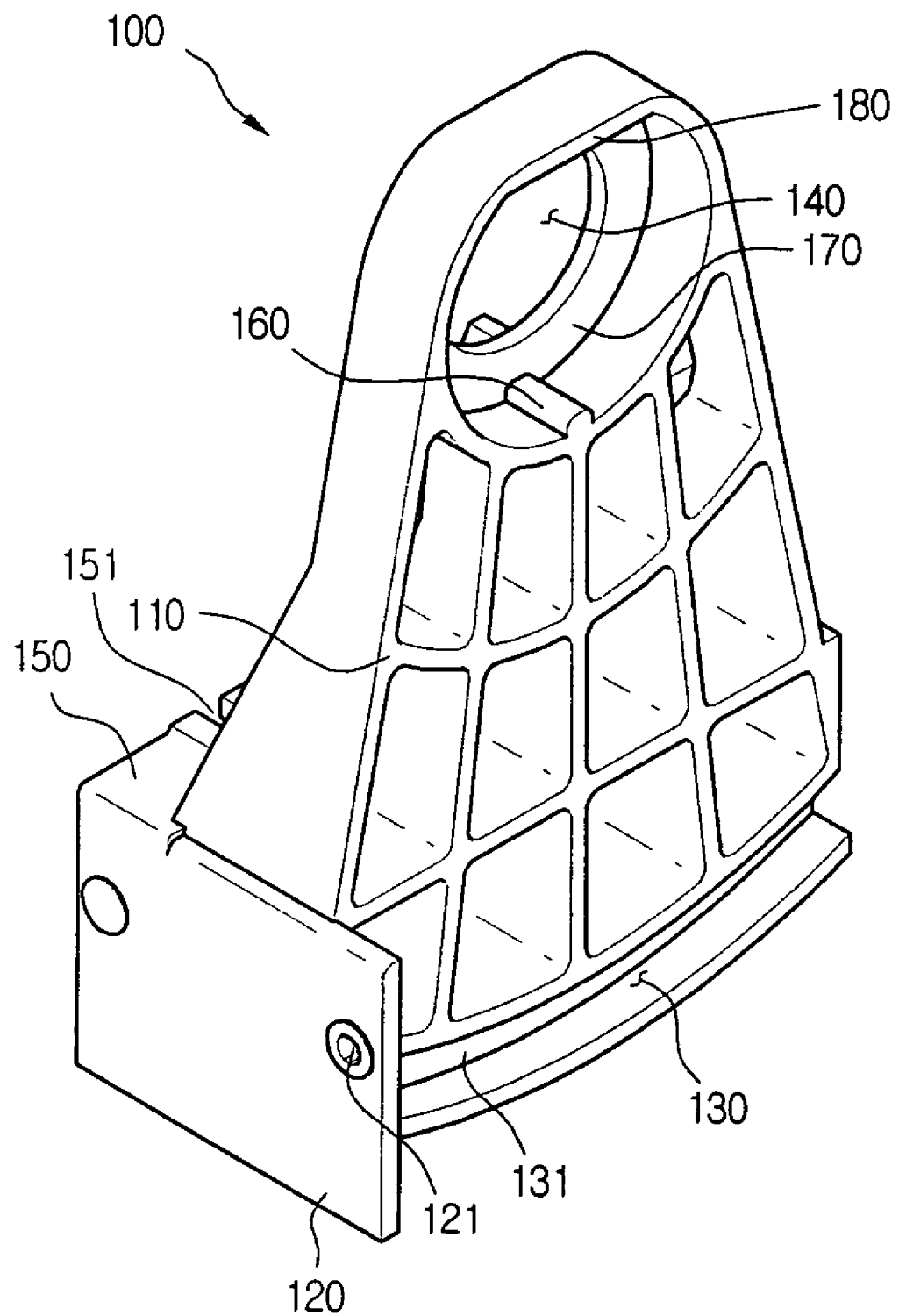
FIG. 8 is an enlarged perspective view illustrating a motor supporter.
Figure 9:
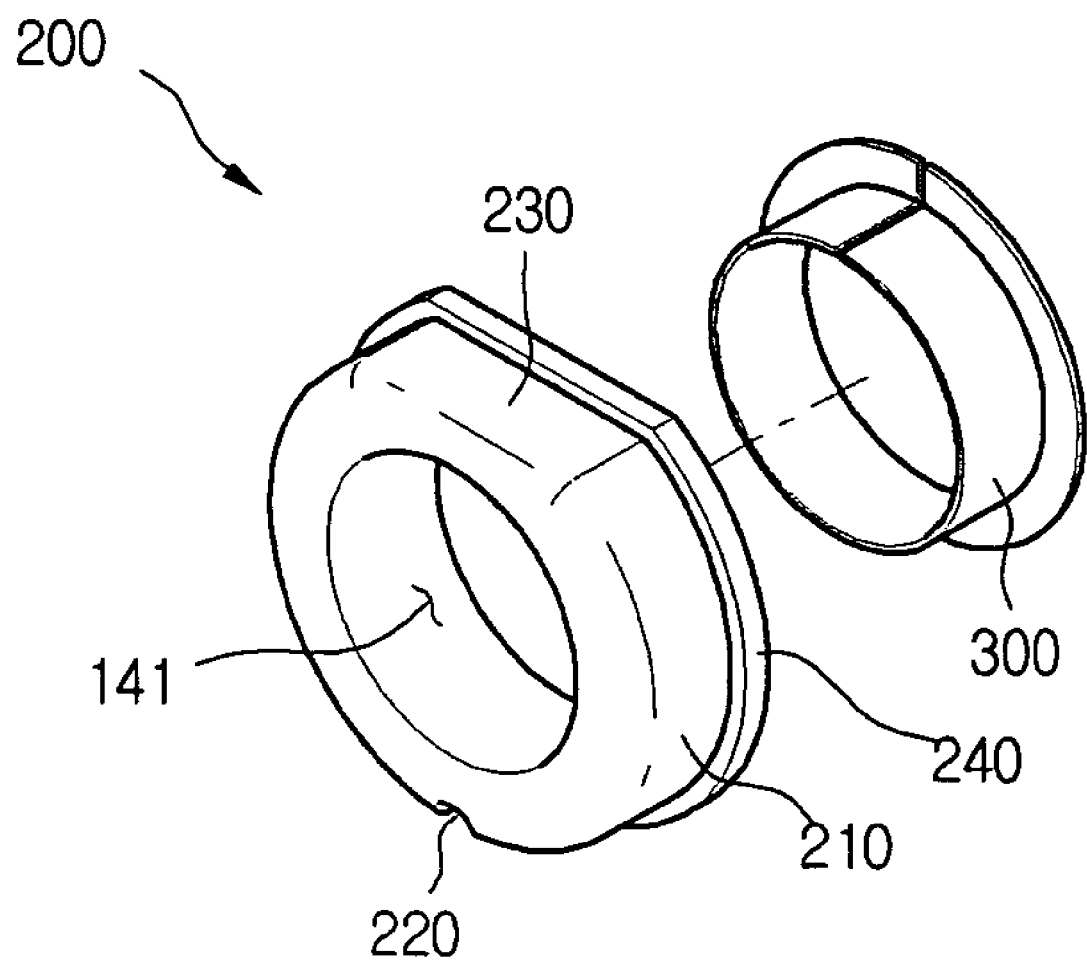
FIG. 9 is an enlarged perspective view illustrating a cushion part.

FIG. 7 is a perspective view illustrating the base from which the motor is released, FIG. 8 is an enlarged perspective view illustrating the motor supporter, and FIG. 9 is an enlarged perspective view illustrating a cushion part.

Referring to FIGS. 7 to 9, the cushion 200 and the anti-friction bushing 300 are respectively inserted into the motor shaft through-hole 140 and a cushion inserting part 460. The cushion inserting part 460 is provided at a side surface of the base 400 to allow the drying fan side motor shaft 21 to pass through. Therefore, the motor 17 is supported at its both sides, and the vibration of the motor 17 can be absorbed without the propagation to the external.

In detail, the cushion 200 is formed of material having a good absorption capability of impact and vibration, and is preferably formed of rubber material. Further, the cushion 200 includes a cushion body 210 having a predetermined width; and an impact absorption rib 240 provided at an upper side of the cushion body 210 and having a little larger outer diameter than the cushion body 210. Further, an anti-rotation protrusion inserting part 220 concaved at a predetermined depth is provided at one side of an exterior circumference surface of the cushion body 210. An anti-rotation flat part 230 having a surface cut in a tangential direction is provided at an opposite side of the anti-rotation protrusion inserting part 220.

Further, the cushion body 210 has a motor shaft pass-through part 141 at its center to allow the passage of the motor shaft, and the anti-friction bushing 300 is fitted into the motor shaft pass-through part 141.

When the motor shaft is rotated, the anti-rotation protrusion inserting part 220 and the anti-rotation flat part 230 prevent the cushion 200 from rotating together with the motor shaft. Therefore, even when the motor is operated for a long time, the cushion 200 can be fixed at an exact original position without vibration.

Further, the anti-friction bushing 300 is inserted inside of the cushion body 210, thereby reducing a frictional force caused by the rotation of the motor shaft. Additionally, the anti-friction bushing 300 prevents a heat, which is caused by the frictional force between the motor shaft and the cushion 200, from being transmitted to the cushion 200 and deforming the cushion 200. Accordingly, the anti-friction bushing 300 is preferably formed of a heat resistant material.

Meanwhile, the motor supporter 100 has a cushion mounting part 180, which has almost circular shape being the same as an outer shape of the cushion body 210, at its top such that the cushion 200 is disposed at the cushion mounting part 180.

Further, the motor shaft through-hole 140 is provided at a center of the cushion mounting part 180 to allow the passage of the motor shaft. Additionally, when the cushion 200 is mounted, an anti-rotation protrusion 160 having a corresponding shape of the anti-rotation protrusion inserting part 220 is engaged with the anti-rotation protrusion inserting part 220 provided at an outer circumference surface of the cushion body 210. Additionally, an anti-rotation flat part 170 having the same shape as the anti-rotation flat part 230 is provided at an opposite side of the anti-rotation protrusion 160.

Of course, the cushion inserting part 460 provided at the base can be also provided to have the same shape as the cushion mounting part 180 of the motor supporter 100.

As such, the cushion 200 and the anti-friction bushing 300 are disposed between the motor shaft and the motor supporter 100 and between the motor shaft and the base 400 to easily absorb the vibration from the motor. Furthermore, the present invention has an advantage in that since even the vibration of the motor does not cause the vibration of the cushion 200, the cushion 200 is not released even when the dryer is operated.

Alternatively, the protrusion and the flat part for preventing the vibration of the cushion 200 can be also exchanged in position. In other words, the protrusion can be also provided at the cushion 200 and the groove can be provided at the cushion mounting part 180.

The present invention has an advantage in that the assembly of the motor and the motor supporter is improved. Further, the present invention has an advantage in that when the dryer is repaired, the motor can be easily dismounted by rotating the motor supporter to separate the base 400 and the motor supporter 100 and then, pushing the motor in an axial direction of the motor. Further, the present invention has an effect in that it is not required to separate the motor supporter, thereby repairing the motor.

Furthermore, the present invention has an advantage in that the motor is improved in operational reliability since the cushion can be firmly fixed in its original position without vibration even though the motor shaft is rotated.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A dryer comprising:
   a cabinet;
   a drum housed inside of the cabinet;
   a motor for providing a driving force to the drum;
   a belt for connecting a driving shaft of the motor with the drum;
   a base disposed at a lower side of the drum;
   a motor supporter having a pass-through part, which is disposed at its one side and supports the driving shaft;
   a cushion provided between the driving shaft and the motor supporter;
   a guide rib provided at the base; and
   a guide rib inserting part provided at the motor supporter to have a corresponding shape of the guide rib, such that the motor supporter is rotatably mounted on the base,
   wherein the motor supporter and the driving shaft have a coincident rotational center and the motor supporter is adapted to rotate around the driving shaft regardless of movement of the drive shaft.

2. The dryer according to claim 1, wherein the guide rib and the guide rib inserting part have a circular arc shape.

3. The dryer according to claim 1, wherein the guide rib inserting part is provided at the same distance centering on the pass-through part.

4. The dryer according to claim 1, wherein the guide rib inserting part is provided at both sides of the motor supporter.

5. The dryer according to claim 1, wherein the driving shaft is extended at both sides of the motor to have one side connected with the belt and the other side connected with a fan.

6. The dryer according to claim 1, wherein the guide rib is horizontally extended at a downwardly concaved portion of the base.

7. The dryer according to claim 1, wherein the motor supporter and the base are firmly fixed.

8. The dryer according to claim 1, wherein the motor supporter has a plurality of reinforcing ribs.

9. The dryer according to claim 1, wherein the cushion has a groove at its outer circumference, and the motor supporter has a protrusion having a corresponding shape of the groove.

10. The dryer according to claim 1, wherein the outer circumference of the cushion and the motor supporter have flat portions having corresponding shapes.

11. The dryer according to claim 1, wherein the cushion is provided between the driving shaft and the base.

12. The dryer according to claim 1, further comprising a bushing disposed at a contact surface of the cushion and the driving shaft.

* * * * *